United States Patent
Zhong et al.

(10) Patent No.: US 8,924,364 B1
(45) Date of Patent: Dec. 30, 2014

(54) EFFICIENT MANAGEMENT OF FILE SYSTEM QUOTA TREES

(71) Applicant: EMC Corporation, Hopkinton, MA (US)

(72) Inventors: Weigang Zhong, Beijing (CN); YingChao Zhou, Beijing (CN); Chen Gong, Beijiing (CN); Yanbei Wang, Shrewsbury, MA (US); Tao Sun, Beijing (CN)

(73) Assignee: EMC Corporation, Hopkinton, MA (US)

( * ) Notice: Subject to any disclaimer, the term of this patent is extended or adjusted under 35 U.S.C. 154(b) by 68 days.

(21) Appl. No.: 13/715,348

(22) Filed: Dec. 14, 2012

(51) Int. Cl.
  *G06F 7/00* (2006.01)
  *G06F 17/00* (2006.01)
  *G06F 17/30* (2006.01)

(52) U.S. Cl.
  CPC .............................. *G06F 17/30303* (2013.01)
  USPC ............ 707/690; 707/821; 707/822; 707/828

(58) Field of Classification Search
  CPC ................... G06F 17/30067; G06F 17/30082; G06F 17/30091; G06F 17/30115; G06F 17/30221
  USPC .......................... 707/687, 690, 821, 822, 828
  See application file for complete search history.

(56) References Cited

U.S. PATENT DOCUMENTS

| | | | |
|---|---|---|---|
| 7,849,112 | B2 | 12/2010 | Mane et al. |
| 8,515,904 | B1 | 8/2013 | Dwyer, III et al. |
| 8,566,371 | B1 | 10/2013 | Bono et al. |
| 2005/0050107 | A1* | 3/2005 | Mane et al. ................... 707/200 |
| 2012/0096059 | A1* | 4/2012 | Shimizu et al. ............... 707/828 |

* cited by examiner

*Primary Examiner* — Hares Jami
(74) *Attorney, Agent, or Firm* — BainwoodHuang

(57) ABSTRACT

A technique for managing usage metrics of quota trees in a file system includes storing, in an inode table that lists inodes of the file system, identifiers (IDs) of quota trees to which the inodes belong. To check the usage of a quota tree, the inode table is scanned for any inodes that reference the quota tree ID of that quota tree. All such inodes are identified, and their usage attributes are summed to calculate an overall usage metric for the quota tree as a whole. The improved technique thus avoids the need to scan directory structures on disk.

16 Claims, 3 Drawing Sheets

| Inode # | Owner | File Size | Byte Count | QTree ID |
|---|---|---|---|---|
| 1234 | EMC_A | 14 MB | 14000128 | 1 |
| 2345 | EMC_A | 1 MB | 1000448 | 1 |
| 3456 | EMC_B | 160 MB | 160000000 | 2 |
| 4567 | EMC_B | 3 MB | 3000320 | 2 |
| 5678 | EMC_A | 4 KB | 4096 | 1 |
| 6789 | EMC_B | 16 KB | 16384 | 2 |
| . . . | | | | |

*FIG. 2*

| QTree ID | Owner | File Size | Byte Count | AD QTree ID | Soft Limit | Hard Limit |
|---|---|---|---|---|---|---|
| 1 | EMC_A | 15.04 MB | 15004672 | 4 | 20000000 | 30000000 |
| 2 | EMC_A | 170 MB | 163016704 | 12 | 200000000 | 300000000 |
| . . . | | | | | | |

*FIG. 3*

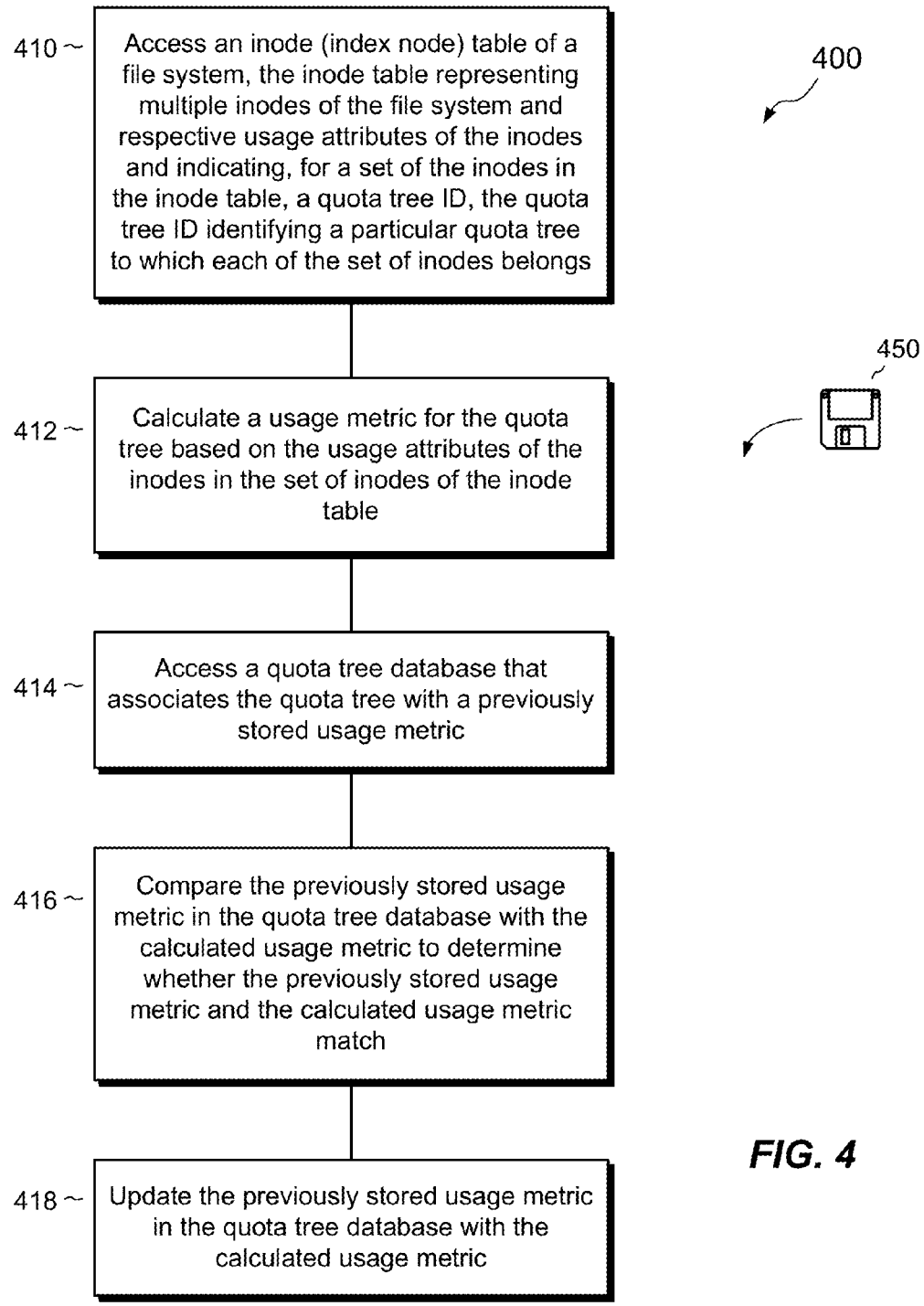

EFFICIENT MANAGEMENT OF FILE SYSTEM QUOTA TREES

BACKGROUND

Storage arrays and other computerized equipment often permit the assignment of quotas to limit the amount of data that can be stored for particular users or groups. Such quotas can be applied to entire directory trees, i.e., structures of files and sub-directories. Quotas assigned to directory trees are known as "quota trees." Quota trees can be created for any number of directory trees of a file system. For each quota tree, an administrator generally establishes a soft limit, i.e., an amount of consumed storage space beyond which a warning to users is generated, and a hard limit, i.e., an amount of consumed storage space beyond which additional storage requests are denied.

Information pertaining to quota trees of a file system is typically stored in a quota tree database. The quota tree database includes, for each quota tree, the soft limit, the hard limit, and a usage metric. The usage metric is updated as needed to reflect the actual amount of data stored in the directory tree to which the quota tree is assigned. The usage metric is expressed either as an aggregated file size (e.g., in bytes) or as a block count, where each block corresponds to a unit of disk storage, such as 1 KB.

Records in the quota tree database can sometimes become corrupted, such that they no longer reflect actual data usage. When an administrator suspects corruption of a record of a particular quota tree, or at any desired time, the administrator can issue a quota check command, e.g., from a command line interface (CLI) on an administrative computer, to initiate a quota check task on the suspected quota tree. The quota check task scans the directory tree to which the quota tree is assigned, calculates actual usage, and compares the result with the usage metric stored in the quota tree database. If the calculated value differs from the stored value, the quota check task updates the record of the quota tree database to reflect the calculated value.

SUMMARY

Unfortunately, the above-described approach to checking quota trees can be time-consuming. When a quota check task is initiated on a designated quota tree, the quota check task reads the directory tree associated with the quota tree. Reading the directory tree generally entails accessing a directory data structure on disk. The quota check task scans the directory data structure to obtain the index node (inode) number of each directory object (file or sub-directory) identified in the directory data structure. For each directory object, the quota check task accesses an inode table for the file system, looks up the referenced inode number in the inode table, and inspects the inode's attributes, including its file size and/or byte count. The quota check task then computes an aggregate sum of file sizes and/or byte counts across all directory objects referenced by the quota tree. When a directory tree includes sub-directories, the check task performs the above operations for each sub-directory. Scanning directory entries for different sub-directories generally entails multiple read operations to different locations on disk. Due to the large number of disk operations, checking large directory structures in this manner can take several seconds.

In addition, the conventional approach is run on one quota tree at a time. Thus, where a system has multiple quota trees, each referencing a different directory tree of a file system, the administrator may be required to launch a different quota check task for each quota tree. The time required to complete all quota check tasks in a system with many quota trees can thus extend to many minutes, perhaps even hours, and can require the administrator's nearly continuous attention.

In contrast with the prior approach, which can be time-consuming and require many disk accesses, an improved technique for managing usage metrics of quota trees in a file system includes storing, in an inode table that lists inodes of the file system, identifiers (IDs) of quota trees to which the inodes belong. To check the usage of a quota tree, the inode table is scanned for any inodes that reference the quota tree ID of that quota tree. All such inodes are identified, and their usage attributes are summed to calculate an overall usage metric for the quota tree as a whole. The improved technique thus avoids the need to scan directory structures on disk when performing quota check tasks. Time consuming activities to read and traverse large directory data structures are thus avoided.

In some examples, the calculated usage metric is compared with a previously stored value, maintained in a quota tree database, and any discrepancies are reported. In some examples, the previously stored usage metric is overwritten in the quota tree database with the newly calculated usage metric.

The improved technique can be operated for multiple quota trees, essentially simultaneously. For example, with a single scan of the inode table, an aggregate usage metric can be computed for each quota tree referenced by a unique quota tree ID in the inode table. Thus, there is no need for an administrator to attend to checking each quota tree individually. Rather, example embodiments provide a way to check all quota trees at once, thus reducing the administrative burden associated with checking quota trees individually. Using this technique, it has been found that the time required to check all quota trees of a file system is often less than the time required to check a single quota tree using the prior technique.

Certain embodiments are directed to a method of managing usage metrics of quota trees in a file system. The method includes accessing an inode (index node) table of the file system, the inode table representing multiple inodes of the file system and respective usage attributes of the inodes and indicating, for a set of the inodes in the inode table, a quota tree ID, the quota tree ID identifying a particular quota tree to which each of the set of inodes belongs. The method further includes calculating a usage metric for the quota tree based on the usage attributes of the inodes in the set of inodes of the inode table.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

FIG. 2 is a diagram of an example inode table provided in the environment of FIG. 1;

FIG. 3 is a diagram of an example quota tree database provided in the environment of FIG. 1; and FIG. 4 is a flowchart of an example process for managing usage metrics of quota trees in a file system.

DETAILED DESCRIPTION OF THE INVENTION

Figure 1:
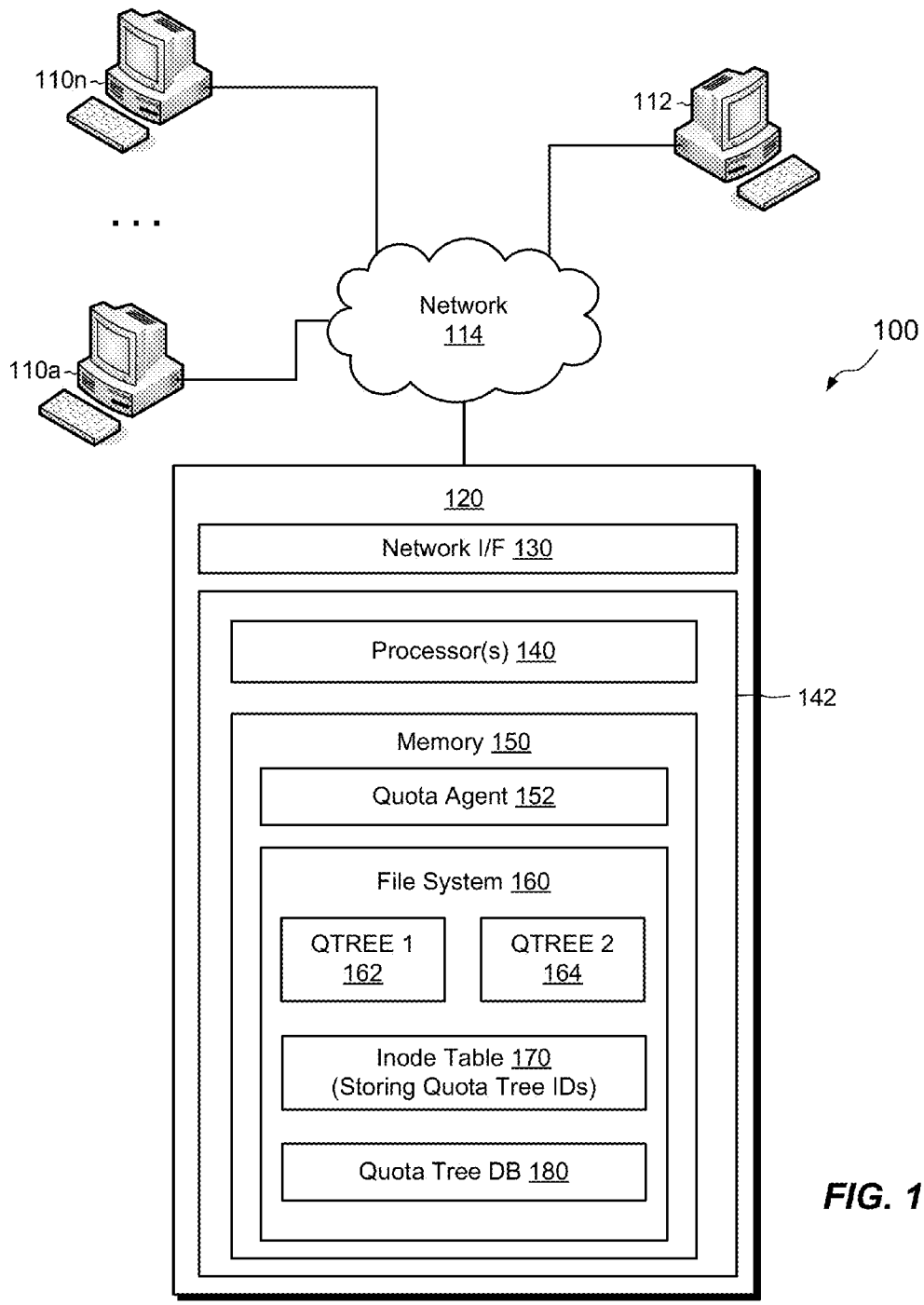
FIG. 1 is block diagram of an example environment in which the improved technique hereof can be practiced.

Embodiments of the invention will now be described. It is understood that such embodiments are provided by way of example to illustrate various features and principles of the invention, and that the invention hereof is broader than the specific example embodiments disclosed.

An improved technique for managing usage metrics of quota trees in a file system includes storing quota tree IDs and associated usage attributes in an inode table of the file system. To check the usage of a quota tree, the inode table is scanned for any inodes that reference the quota tree's ID. All such inodes are identified, and the associated usage attributes are summed to calculate an overall usage metric for the quota tree as a whole.

FIG. 1 shows an example environment 100 in which embodiments of the improved technique hereof can be practiced. Multiple client computing devices, shown as computers 110a through 110n, access a computerized apparatus 120 over a network 114. An administrative computing device 112 also connects to the computerized apparatus 120 over the network 114. The computerized apparatus 120 includes a network interface 130, a set of processors 140 (i.e., one or more processing chips and/or assemblies), and memory 150. The memory 150 includes both volatile memory (e.g., RAM) and non-volatile memory, such as one or more disk drives, solid state drives (SSDs) and the like. The set of processors 140 and the memory 150 together form a specialized circuit 142, which is constructed and arranged to carry out various operations. For example, the memory 150 stores executable instructions. When the executable instructions are run by the set of processors 140, the set of processors 140 carry out various processes and functions, as described herein.

The memory 150 includes a quota agent 152 and a file system 160. Any number of file systems can be provided, although only one is shown in FIG. 1 for simplicity. The file system 160 defines various quota trees, e.g., qtree 1 (162) and qtree 2 (164). Each of the quota trees 162 and 164 applies to a particular directory structure within the file system 160. For example, a root of the file system 160 may include a number of directory trees, each of which includes files and sub-directories. In an example, each of the quota trees 162 and 164 is defined to apply to one such directory tree. Any number of quota trees may be provided.

The memory 150 is seen to further include an inode table 170 and a quota tree database 180. The inode table 170 has multiple fields, including a field for quota tree ID. The inode table 170 also includes other fields, such as a field for inode number, owner, and one or more usage attribute fields. The inode table 170 has multiple entries (rows, records, etc.) for different inodes, where each entry has a unique inode number. If an inode listed in the inode table 170 is part of a quota tree, the entry for the inode in the inode table 170 also specifies the quota tree ID of the quota tree to which the inode belongs.

The quota tree database 180 stores records of information related to particular quota trees. The quota tree database 180 has multiple fields, which include, for example, a field for quota tree ID, one or more fields for data usage associated with each quota tree ID, a soft limit for data storage, and a hard limit for data storage.

The client devices 110a through 110n and the administrative device 112 are shown as computers; however, it is understood that the client devices 110a through 110n and administrative device 112 may be any type of computing device, such as desktop computers, laptop computers, smart phones, personal data assistants (PDAs), tablet computers, set top boxes, or any type of computing device capable of connecting over a network. The client devices 110a through 110n and the administrative device 112 need not be of the same type, and any number of client devices and/or administrative devices may be provided. The network 114 can be any type of network, such as the Internet, a local area network (LAN), a wide area network (WAN), a cell phone network, a wireless data network, or any combination of these, for example. Similarly, the computerized apparatus 120 can be any type of computing device or system capable of connecting to a network. In one particular example, the computerized apparatus 120 is a network attached storage system (NAS), which includes, as part of the memory 120, a storage array, such as a VNX® array available from EMC Corporation of Hopkinton, Mass.

In operation, an administrator interacts with the administrative device 112 to set up quota trees on the computerized apparatus 120. For example, the administrator connects to the computerized apparatus 120 over the network 114, logs on to the computerized apparatus 120, and proceeds to invoke the quota agent 152. The administrator may operate the quota agent 152 to assign a first directory tree of the file system 160 to qtree 1 and a second directory tree of the file system 160 to qtree 2. The administrator may specify a soft limit and/or a hard limit for storage for each new quota tree.

Upon creation of the new quota tree, the quota agent 152 generates a new quota tree ID. In an example, quota tree IDs are generated in an auto-incrementing fashion, such that each new quota tree ID is one greater than the immediately previously generated quota tree ID.

The quota agent 152 also updates the inode table 170. For example, the quota agent 152 traverses the directory tree to which the new quota tree is assigned. For each entry in the directory tree, the quota agent 152 reads the inode number of the entry, looks up the inode number in the inode table 170, and updates the record for the inode number to include the new quota tree ID. In this fashion, the inode table 170 is made to reflect the new quota tree ID for each directory object (e.g., file and sub-directory) specified in the directory tree.

The quota agent 152 also creates a new record in the quota tree database 180. The quota agent 152 stores the new quota tree ID, as well as the soft limit and the hard limit (if provided). The quota agent 152 may also calculate initial usage metrics, such as aggregate file size of the directory tree and/or aggregate byte count, and store any such usage metrics in the newly created record of the quota tree database 180. Initial usage metrics are preferably calculated according to the same process, described below, for verifying metrics during a quota check task.

Once the new quota tree is created, users may access the file system 160 over the network 114 using the client devices 110a through 110n. For example, users may store files in the directory tree to which the new quota tree is assigned. The quota agent 152 monitors usage of the new quota tree, issues warnings to users if the soft limit for the quota tree is exceeded, and denies storage requests if the hard limit has been reached.

Each time an object in the directory tree to which the quota tree is assigned is stored, updated, or deleted, the inode table 170 is updated to reflect any new usage attribute(s) in the inode associated with the object. The record for the quota tree in the quota tree database 180 is also updated to reflect changes in aggregate usage metrics.

At some point while the quota tree is in use, the administrator may suspect that the quota tree database 170 has become corrupted. The administrator may also wish simply to check the quota tree, e.g., as part of regular maintenance. To verify proper operation, the administrator may execute an upgraded check task process. The quota agent 152 executes the updated check task process by searching the inode table 170 for any inodes belonging to the new quota tree, i.e., inodes for which the stored quota tree ID matches the quota tree ID of the new quota tree. For each inode in the inode table 170 that meets this criterion, one or more associated types of usage attributes are read, and the usage attributes of each type are summed across all matching inodes to compute one or more new aggregate usage metrics.

In some examples, the quota agent 152 presents the computed usage metric(s) to the administrator, e.g., causes the computed usage metric(s) to be displayed on a monitor of the administrative device 112. The quota agent 152 may indicate any differences between the computed usage metrics and those stored in the quota tree database 180 for the same quota tree. At the administrator's option, or automatically, the quota agent 152 may apply the newly computed storage metric(s) to overwrite the values stored in the quota tree database 180 for the respective metric(s). Any corruption in the values of the metrics stored in the quota tree database 180 is therefore corrected.

The upgraded check task operates by accessing the inode table 170 and without any need to access the underlying directory tree. The time consuming activity of accessing and traversing a directory tree, which can be large and scattered across multiple locations on disk, is therefore avoided.

In some examples, the upgraded check task process includes a feature for checking multiple quota trees of a file system, including all such quota trees, simultaneously. To check multiple, or all, quota trees, the quota agent 152 accesses the inode table 170. For each unique quota tree ID in the inode table 170, the quota agent 152 calculates one or more usage metrics. For example, if the inode table 170 stores inodes for 10 different quota trees, and each such inode has 2 usage attributes, then the quota agent 152 computes 2 usage metrics for each of the quota trees (i.e., 20 different usage metrics). The quota agent 152 may then cause the computed values of the metrics to be displayed and compared with corresponding metrics in the quota tree database 180. The quota agent 152 may also overwrite metrics in the quota tree database 180 with the newly computed values. These activity are accomplished without requiring access to any directory trees on disk for any of the quota trees.

As the inode table 170 and the quota tree database 180 are accessed whether one quota tree is checked or many, the computational burden associated with checking all quota trees is only slightly greater than that of checking a single quota tree. Also, the upgraded quota check task is relatively simple to run by the administrator, who needs merely to launch a quota check task specifying all quota trees and receive the results within seconds, even when the quota trees relate to a large number of complex directories.

FIG. 2 shows an example inode table 170 in greater detail. Here, it is seen that the inode table 170 includes fields for inode number, owner, file size, byte count, and quota tree (QTree) ID. Different numbers of fields may be provided for different implementations. It is understood that a typical file system may include a great many inodes and many different quota trees, although only a few inodes and two quota trees (QTree IDs 1 and 2) are shown. Although each of the inodes shown in FIG. 2 has an associated quota tree ID (i.e., each "belongs" to a quota tree), it is understood that some inodes in the inode table 170 may not belong to any quota tree, in which case the quota tree field may include a blank, a null value, or some other value designating that no quota tree is assigned.

The example inode table 170 of FIG. 2 includes fields for storing two different types of usage attributes, file size and byte count. File size refers to the size of the particular object represented by the inode, whereas byte count refers to the amount of space required to store the object on disk. Disk space is typically allocated in fixed-size units, such that the byte count required to store a file may be greater than the file size. Contrarily, file size may include "holes," or empty regions, which are typically not part of the object's byte count). It is understood that inode tables may include greater or fewer numbers of usage attributes in different implementations. In addition, some implementations may be concerned only with file size, whereas others are concerned only with byte count. Still others are concerned with both, or with some other usage attribute.

When the administrator enters a check task command to check all quota trees in the file system, the inode table 170 is accessed. The quota agent 152 adds all the file size attributes for each unique quota tree ID to generate a respective sum. For example, the quota agent 152 adds together the file size attributes for inodes 1234, 2345, and 5678, to produce a sum for qtree 1. The quota agent 152 also adds together the file size attributes for inodes 3456, 4567, and 6789, to produce a sum for qtree 2. The quota agent 152 performs a similar process for byte count, generating one sum for qtree 1, by adding the byte counts of inodes 1234, 2345, and 5678, and generating another sum for qtree 2, by adding the byte counts for inodes 3456, 4567, and 6789. In an example, such sums for file size and/or byte count are displayed to the administrator and may be compared with metrics stored in the quota tree database 180 and/or used to overwrite metrics in the quota tree database 180.

FIG. 3 shows an example quota tree database 180 in additional detail. Here, two records are seen to store information about two quota trees (1 and 2). In an example, the quota tree database 180 stores a different record for each quota tree in the file system 160. For example, if the file system 160 has 1000 different quota trees, the quota tree database 180 stores 1000 different records. The quota tree database 180 has a number of fields, which include, in the illustrated example, fields for quota tree (QTree) ID, owner, file size metric, byte count metric, admin (AD) quota tree ID, soft limit, and hard limit. The file size metric and byte count metric fields store aggregate sums and thus apply to each respective quota tree as a whole. The soft limit and hard limit are typically set by the administrator, e.g., by accessing the quota agent 152 via the administrative device 112, to designate usage levels at which warnings are generated, when the soft limits are reached, and at which storage requests are denied, when the hard limits are reached. The soft limits and hard limits may be specified as aggregate file sizes or as aggregate byte counts. Here, they are specified as aggregate byte counts.

The admin (AD) quota tree ID field stores IDs specified by the administrator. These IDs are allowed to differ from the Qtree IDs to permit the administrator to re-use references for quota tree IDs and to reference quota trees with small numbers. Quota tree IDs are typically set by the quota agent 152 in an auto-incrementing fashion. When the administrator deletes a quota tree, the quota tree ID is not reused. Also, when the administrator creates a new quota tree, the next number is used, i.e., the number that is one greater than that of the immediately previously created quota tree. As a consequence, quota tree IDs can become large numbers. Realizing that administrators may prefer to use smaller numbers, and may prefer to reuse numbers of deleted quota trees, the concept of the admin quota tree IDs is thus applied, where an administrator can assign any unused admin ID number to a quota tree, regardless of its actual quota tree ID. The quota tree database 180 records the admin quota tree ID for each quota tree, thus maintaining a mapping between admin quota tree IDs and actual quota tree IDs.

In operation, the quota agent 152 monitors activities in each quota tree. The quota agent 152 keeps the values for file size and byte count metrics current in the quota tree database 180. The quota agent 152 also tests an aggregate metric (here, the byte count metric) against the soft limit and the hard limit, issuing alerts and denying storage requests where appropriate.

Sometimes, one or more records of the quota tree database 180 can become corrupted. Corruption can be manifested in various ways. In some circumstances, corruption of a record can cause an alert or denial in response to a storage request when actual usage is still below the preset limits. In other circumstances, storage requests can continue to be processed even though actual limits have been exceeded. When the administrator suspects corruption, or at any time, such as on a regular basis, the administrator invokes the check task command to verify the usage metrics. As described in connection with FIG. 2, the check task command causes the quota agent 152 to access the inode table 170 and compute aggregate metric values from the usage attributes for each of the quota trees. Computed metric values are then displayed to the administrator, along with corresponding values from the quota tree database 180 (e.g., the file size metric and/or byte count metric for the respective quota trees). At the administrator's option, or automatically, the quota agent 152 applies the computed values of the usage metrics from the inode table 170 to overwrite the values for the corresponding quota trees in the quota tree database 180. For example, an aggregate file size metric computed from the inode table 170 for qtree 1 is stored in the file size metric field of the record for qtree 1 in the quota tree database 180. Similarly, an aggregate block count metric computed from the inode table 170 for qtree 1 is stored in the block count metric field of the record for qtree 1 in the quota tree database 180. If the administrator runs the check task for multiple quota trees, or for all quota trees, then the metric fields for all such quota trees in the quota tree database 180 may be updated.

FIG. 4 shows a process 400 for managing usage metrics of quota trees in a file system. The process 400 may be carried out in connection with the computing apparatus 120. The process 400 is typically performed by the quota agent 152 and associated software constructs, described in connection with FIGS. 1-3, which include executable instructions that reside in the memory 150 of the computing apparatus 120 and are run by the set of processors 140. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

At step 410 of the process 400, an inode (index node) table of a file system is accessed. The inode table represents multiple inodes of the file system and respective usage attributes of the inodes. The inode table indicates, for a set of the inodes in the inode table, a quota tree ID. The quota tree ID identifies a particular quota tree to which each of the set of inodes belongs. For example, the quota agent 152 accesses the inode table 170 of the file system 160. The inode table 170 represents multiple inodes (e.g., as shown in FIG. 2) and respective usage attributes, such as file size and byte count. The inode table 170 includes a set of inodes, e.g., inodes 1234, 2345, and 5678 of qtree 1.

At step 412, a usage metric is calculated for the quota tree based on a usage attribute of the inodes in the set of inodes of the inode table. For example, the quota agent 152 calculates an aggregate byte count metric for qtree 1 by adding together the byte count attributes of all of the inodes in qtree 1.

At step 414, a quota tree database is accessed. The quota tree database associates the quota tree with a previously stored usage metric. For example, the quota agent 152 accesses quota tree database 180 and looks up the entry for qtree 1, where the quota tree database 180 specifies a byte count for qtree 1.

At step 416, the previously stored usage metric in the quota tree database is compared with the calculated usage metric to determine whether the previously stored usage metric and the calculated usage metric match. For example, the quota agent 152 compares the byte count metric stored for qtree 1 in the quota tree database 180 with the aggregate byte count metric calculated at step 412.

At step 418, the previously stored usage metric in the quota tree database is updated with the calculated usage metric. For example, the quota agent 152 updates the byte count metric for qtree 1 in the quota tree database 180 with the aggregate byte count metric calculated at step 412.

The process 400 can be conducted for multiple quota trees, or for all quota trees in the file system 160, essentially simultaneously. The process 400 can thus be conducted without requiring access to, or traversal of, any directory structures of the file system 160 on disk.

An improved technique has been described for managing usage metrics of quota trees in a file system. The technique includes storing, in an inode table 170 that lists inodes of the file system 160, quota tree IDs to which the inodes belong. To check the usage of a quota tree, the inode table 170 is scanned for any inodes that reference the quota tree ID of that quota tree. All such inodes are identified, and their usage attributes are summed to calculate an overall usage metric for the quota tree as a whole. Time consuming activities to traverse large directory data structures are thus avoided.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, although the inode table 170 is shown and described as a singular structure, the inode table 170 may alternatively be implemented in a distributed fashion, such as in different portions of a disk or multi-disk structure. The inode table may be constructed from separate tables or data structures, which are joined together logically rather than physically.

Similarly, the quota database 180 may be singular or distributed, and may be created from multiple databases or data structures. Also, the quota agent 152 may be implemented as a single software construct, or as multiple constructs.

Although reference is made to files and directory structures stored on disks, it is understood that such files and directory structures may be stored in any type of nonvolatile memory. The improved technique hereof is therefore not limited to magnetic disk drives or to any particular type of medium or media.

Also, although certain types of usage metrics have been described (e.g., aggregate file size and aggregate byte count), it is understood that these are merely examples. According to one variant, the quota tree database 180 stores an aggregate metric for file count, as well as an associated soft limit and a hard limit, for each quota tree. The file count metric may be used to limit the total number of files that can exist in a given quota tree. The inode table 170 stores an attribute for inode type, which designates whether the inode corresponds to a file, a sub-directory, or some other type of inode. During a quota check task, the quota agent 152 scans the inode table 170 and accumulates a count, for each quota tree (or any selected quota trees), of all inodes identified as files (by referring to the inode type attributes). The quota agent 152 then compares the computed counts with the aggregate metrics for file count stored in the quota tree database 180. Newly computed counts can be applied to overwrite counts previously stored in the quota tree database 180.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of managing usage metrics of quota trees in a file system, comprising:
   accessing an inode (index node) table of the file system from memory, the inode table representing multiple inodes of the file system and respective usage attributes of the inodes and indicating, for a set of the inodes in the inode table, a quota tree ID, the quota tree ID identifying a particular quota tree to which each of the set of inodes belongs; and
   calculating, via a set of processors coupled to the memory, a usage metric for the quota tree based on the usage attributes of the inodes in the set of inodes of the inode table;
   accessing a quota tree database that associates the quota tree with a previously stored usage metric; and
   updating the previously stored usage metric in the quota tree database with the calculated usage metric,
   wherein the respective usage attributes of the inodes relate to an amount of space that objects represented by the inodes in the inode table occupy in memory, and wherein the calculated usage metric relates to an amount of space that all objects represented in the set of inodes together occupy in the memory,
   wherein the inode table further indicates, for additional sets of inodes, additional respective quota tree IDs identifying quota trees to which each of the additional sets of inodes belongs, wherein the quota tree database associates each of the additional quota trees with a previously stored usage metric, and wherein the method further comprises:
      calculating a usage metric for each of the additional quota trees based on the usage attributes represented by the inodes in each of the respective additional sets of inodes in the inode table; and
      updating each previously stored usage metric in the quota tree database with the respective calculated usage metric,
   wherein calculating the usage metric of the quota tree and calculating the usage metrics of each of the additional quota trees are performed with a single accessing of the inode table.

2. The method of claim 1, wherein the respective usage attributes include a file size attribute associated with each of the inodes, and wherein calculating the usage metric includes computing a sum, across all inodes of the set of inodes, of the file size attributes.

3. The method of claim 1, wherein the respective usage attributes include a block count attribute associated with each of the inodes, and wherein calculating the usage metric includes computing a sum, across all inodes of the set of inodes, of the block count attributes.

4. The method of claim 1, wherein calculating the usage metric of the quota tree and calculating the usage metric of each of the additional quota trees together include:
   scanning the inode table to identify each inode for which a quota tree ID is indicated; and
   computing, for each unique quote tree ID in the inode table, a respective sum of the usage attributes represented by the inodes in each of the respective sets of inodes.

5. The method of claim 4, wherein calculating the usage metric of the quota tree and calculating the usage metric of each of the additional quota trees are performed without accessing any directory in which objects belonging to any quota tree of the file system are stored.

6. The method of claim 5, further comprising, saving a quota tree ID in the inode table for an inode of an object in response to the object being added to a directory that belongs to a quota tree identified with the quota tree ID.

7. The method of claim 5, further comprising, saving multiple quota tree IDs in the inode table for multiple inodes representing respective objects in response to a new quota tree being created that includes the objects represented by the inodes.

8. The method of claim 4, wherein the quota tree database includes multiple records, each record associating a quota tree ID with (i) a usage metric and (ii) a maximum allowed value of the usage metric.

9. A computing apparatus, comprising:
   a set of processors; and
   memory, coupled to the set of processors, the memory storing executable instructions, which when executed by the set of processors cause the set of processors to:
      access an inode (index node) table of a file system, the inode table representing multiple inodes of the file system and respective usage attributes of the inodes and indicating, for a set of the inodes in the inode table, a quota tree ID, the quota tree ID identifying a particular quota tree to which each of the set of inodes belongs;

calculate, with a single accessing of the inode table, a usage metric for the quota tree based on a usage attributes of the inodes in the set of inodes of the inode table;

access a quota tree database that associates the quota tree with a previously stored usage metric; and compare the previously stored usage metric in the quota tree database with the calculated usage metric to determine whether the previously stored usage metric and the calculated usage metric match, wherein the inode table further indicates, for additional sets of inodes, additional respective quota tree IDs identifying quota trees to which each of the additional sets of inodes belongs, wherein the quota tree database associates each of the additional quota trees with a previously stored usage metric, and wherein the executable instructions further cause the set of processors to:

calculate a usage metric for each of the additional quota trees based on the usage attributes represented by the inode in each of the respective additional sets of inodes in the inode table; and update each previously stored usage metric in the quota tree database with the respective calculated usage metric, wherein the executable instructions cause the set of processors to calculate the usage metric of the quota tree and to calculate the usage metrics of each of the additional quota trees with a single accessing of the inode table.

10. The computing apparatus of claim 9, wherein the respective usage attributes of the inodes relate to an amount of space that objects represented by the inodes in the inode table occupy in memory, and wherein the calculated usage metric relates to an amount of space that all objects represented in the set of inodes together occupy in the memory.

11. The computing apparatus of claim 10, wherein, when caused to calculate the usage metric of the quota tree and to calculate the usage metric of each of the additional quota trees, the executable instructions further cause the set of processors to:

scan the inode table to identify each inode for which a quota tree ID is indicated; and compute, for each unique quote tree ID in the inode table, a respective sum of the usage attributes represented by the inodes in each of the respective sets of inodes.

12. A non-transitory computer readable medium including memory storing instructions which, when executed by a set of processors of a computing apparatus, cause the set of processors to perform a method of verifying usage metrics of quota trees in a file system, the method comprising:

accessing an inode (index node) table of the file system, the inode table representing multiple inodes of the file system and respective usage attributes of the inodes and indicating, for a set of the inodes in the inode table, a quota tree ID, the quota tree ID identifying a particular quota tree to which each of the set of inodes belongs;

calculating, via the set of processors and with a single accessing of the inode table, a usage metric for the quota tree based on a usage attributes of the inodes in the set of inodes of the inode table;

accessing a quota tree database that associates the quota tree with a previously stored usage metric; and comparing the previously stored usage metric in the quota tree database with the calculated usage metric to determine whether the previously stored usage metric and the calculated usage metric match, wherein the inode table further indicates, for additional sets of inodes, additional respective quota tree IDs identifying quota trees to which each of the additional sets of inodes belongs, wherein the quota tree database associates each of the additional quota trees with a previously stored usage metric, and wherein the method further comprises:

calculating a usage metric for each of the additional quota trees based on the usage attributes represented by the inodes in each of the respective additional sets of inodes in the inode table; and updating each previously stored usage metric in the quota tree database with the respective calculated usage metric.

13. The non-transitory computer readable medium of claim 12, wherein the method further comprises updating the previously stored usage metric in the quota tree database with the calculated usage metric.

14. The non-transitory computer readable medium of claim 12, wherein calculating the usage metric of the quota tree and calculating the usage metrics of each of the additional quota trees are performed with a single accessing of the inode table.

15. The non-transitory computer readable medium of claim 12, wherein the quota tree database includes multiple records, each record specifying a respective quota tree ID and a respective administrative quota tree ID, each quota tree ID providing a first numerical identifier for uniquely identifying a respective quota tree in the quota tree database, each administrative quota tree ID providing a second numerical identifier for uniquely identifying the respective quota tree in the quota tree database, wherein the administrative quote tree ID for at least one quota tree identified in the quota tree database is smaller than the respective quota tree ID for identifying the same quota tree in the quota tree database.

16. The non-transitory computer readable medium of claim 15, wherein the method further comprises, in response to creating a new quota tree:

assigning a quota tree ID to the new quota tree, the quota tree ID having a numerical value greater than any quota tree ID previously used in the file system; and assigning an administrative quota tree ID to the new quota tree, the administrative quota tree ID having a numerical value equal to a previously assigned but currently unused quota tree ID in the file system.

\* \* \* \* \*